US005976640A

United States Patent [19]

Yu et al.

[11] Patent Number: 5,976,640

[45] Date of Patent: Nov. 2, 1999

[54] OPTICAL ALIGNMENT COMPOSITION, ALIGNMENT LAYER FORMED USING THE SAME AND LCD HAVING THE ALIGNMENT LAYER

[75] Inventors: Han-sung Yu, Suwon; Byung-hoon Chae, Seoul, both of Rep. of Korea

[73] Assignee: Samsung Display Devices Co., Ltd., Kyungki-do, Rep. of Korea

[21] Appl. No.: 08/998,841

[22] Filed: Dec. 29, 1997

[30] Foreign Application Priority Data

Dec. 30, 1996 [KR] Rep. of Korea ...................... 96-76959

[51] Int. Cl.[6] .......................... C09K 19/00; C09K 19/56; G02F 1/1337; B32B 27/08

[52] U.S. Cl. ....................... 428/1.1; 252/299.4; 428/47.4; 349/123

[58] Field of Search .......................... 252/299.4; 428/1.1, 428/474.4; 349/123

[56] References Cited

U.S. PATENT DOCUMENTS

| | | | |
|---|---|---|---|
| 4,561,726 | 12/1985 | Goodby et al. | 349/123 X |
| 5,538,823 | 7/1996 | Park et al. | 430/20 |
| 5,578,697 | 11/1996 | Kawamonzen et al. | 528/353 |
| 5,612,450 | 3/1997 | Mizushima et al. | 528/353 |
| 5,670,084 | 9/1997 | Harada et al. | 252/299.01 |
| 5,705,096 | 1/1998 | Kano et al. | 252/299.4 |
| 5,824,377 | 10/1998 | Pirwitz et al. | 428/1 |

*Primary Examiner*—C. H. Kelly
*Attorney, Agent, or Firm*—Lowe Hauptman Gopstein Gilman & Berner

[57] ABSTRACT

An optical alignment composition including polyimide having a cinnamate group at its side chain is disclosed. Also, there are disclosed an alignment layer formed using the composition and a liquid crystal display device (LCD) having the same. The alignment layer has an excellent thermal stability. According to the present invention, Since the alignment layer with excellent thermal stability is obtained, the LCD having excellent performance can be manufactured.

9 Claims, 1 Drawing Sheet

OPTICAL ALIGNMENT COMPOSITION, ALIGNMENT LAYER FORMED USING THE SAME AND LCD HAVING THE ALIGNMENT LAYER

BACKGROUND OF THE INVENTION

1. Field of the Invention

The present invention relates to a liquid crystal display device (LCD), and more particularly, to an optical alignment composition containing polyimide having excellent thermal stability, an alignment layer formed using the optical alignment composition, and an LCD having the alignment layer.

2. Description of the Related Art

In general, as shown in FIG. 1, an LCD has a pair of upper and lower substrates 2 and 2' spaced apart and opposed to each other. Transparent electrode layers 3 and 3' are respectively formed on the upper and lower substrates 2 and 2'. Insulating layers 4 and 4' and alignment layers 5 and 5' are sequentially formed on the transparent electrodes 3 and 3'. A liquid crystal layer 7 is formed in the space between the upper and lower substrates 2 and 2'. Polarizing plates 1 and 1' for polarizing entering and transmitting lights are provided on the exterior of the substrates 2 and 2', respectively.

In the LCD having the aforementioned structure, according to an externally applied voltage, the arrangement of liquid crystals influenced by the electric field is changed. According to the changed arrangement, external light introduced to the LCD is shielded or transmitted. The LCD is driven by such a property. In other words, if a voltage is applied to the transparent electrode layers 3 and 3', an electric field is formed in the liquid crystal layer 7. Thus, liquid crystals are driven in a predetermined direction. The light introduced into the liquid crystals of the LCD is shielded or transmitted according to the driving direction of the liquid crystals.

The functions of the LCD as a display device, i.e., light transmittance, response time, view angle or contrast, are determined by the arrangement characteristic of the liquid crystal molecules. Therefore, the technology of controlling the uniform alignment of the liquid crystal molecules is very important.

The uniform alignment state of the liquid crystals is difficult to accomplish by merely interposing the liquid crystals between the upper and lower substrates. Thus, as shown in FIG. 1, it is know to form the alignment layers 5 and 5' for aligning liquid crystals on the transparent electrode layers 3 and 3'.

The alignment layer is conventionally formed by a rubbing method in which a thin film made of an organic polymer material such as polyimide or polyamide is formed, cured and then rubbed with a special cloth.

The rubbing method is easy to conduct and the process thereof is simple. However, minute particles or materials such as cellulose may separate from the cloth used in the rubbing treatment and contaminate the alignment layer. Further, depending on the material for forming the alignment layer, the alignment may not be accomplished smoothly. A thin film transistor may be damaged by static electricity generated during the rubbing treatment.

To solve the above-described problems, an optical alignment technology has been developed in which dust, static electricity or other pollutant particles are not generated and cleanliness is maintained during the overall process. According to such a non-destructive alignment method, polarized light is irradiated onto the optical alignment layer to cause anisotropic photopolymerization. As a result, the optical alignment layer has and alignment characteristic, thereby uniformly aligning the liquid crystals. The polymer for the optical alignment layer includes polyvinylcinnamate (PVCN) and polyvinylmethoxyxinnamate (PVMC). However, although they have an excellent optical alignment property, such polymers have poor thermal stability. In other words, the thermal stability of an alignment layer depends upon that of the polymer, which depends upon a glass transition point and cross linking density. Since the PVCN or PVMC has a relative glass transition point of 100° C. or below, post-alignment thermal stability is decreased.

SUMMARY OF THE INVENTION

To solve the above problem(s), it is an object of the present invention to provide an optical alignment composition having excellent thermal stability.

It is another object of the present invention to provide an alignment layer formed using the optical alignment composition.

It is still another object of the present invention to provide a liquid crystal display (LCD) having the alignment layer.

Accordingly, to achieve the first object, there is provided an optical alignment composition comprising polyimide having a cinnamate group at its side chain.

The second object of the present invention is achieved by an alignment layer comprising polyimide having a cinnamate group at its side chain The third object of the present invention is achieved by an LCD comprising an alignment layer including polyimide having a cinnamate group at its side chain.

DESCRIPTION OF THE PREFERRED EMBODIMENT(S)

Figure 1:
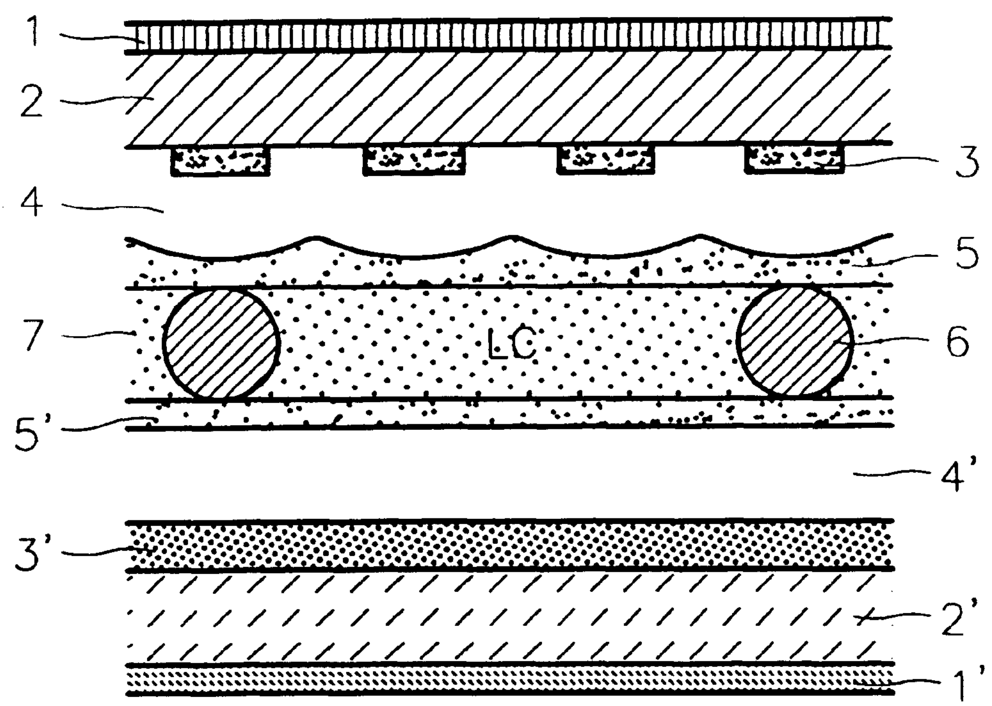
FIG. 1 is a section view of a general liquid crystal display.

In the optical alignment composition according to the present invention, the polyimide having a cinnamate group at its side chain is represented by the formula 1:

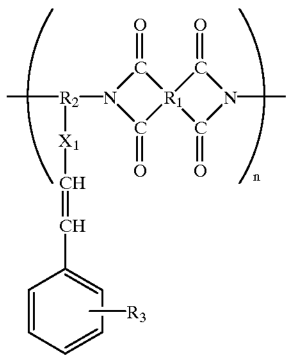

where $R_1$ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B. A and B are each independently selected from the group consisting of a unsubstituted aromatic ring or an aromatic ring. (This aromatic ring is a monocyclic ring of six carbon atoms, a bicyclic ring of ten carbon atoms or a tricyclic ring of fourteen carbon atoms.), and Y is —O—, carbonyl(C═O) or —$C(R_4)$ $(R_5)$— (Here. $R_4$ and $R_5$ are each independently selected from the group consisting of hydrogen, $C_1$–$C_{10}$ alkyl, and $C_1$–$C_{10}$ alkyl having at least one substituent (G) $R_2$ is selected from the group consisting of an unsubstituted aromatic ring or aromatic ring having at least one substituent (G). The aromatic ring is a monocyclic ring of six carbon atoms, a bicyclic ring of ten carbon atoms or a tricyclic ring of fourteen carbon atoms.)., a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the formula A—Y—B (Here, A, B and Y are the same as described above; $X_1$ represents —COOCO— or —OCO—; and $R_3$ is hydrogen, halide, a $C_1$–$C_{10}$ alkyl, a $C_1$–$C_{10}$ alkyl having at least one substituent (G), a $C_1$–$C_{10}$ alkoxy or a $C_1$–$C_{10}$ alkoxy having at least one substituent (G). The substituent (G) is selected from the group consisting of a $C_1$–$C_{10}$ alkyl, phenyl, unsubstituted or substituted amino, a halide, a hydroxy (OH), a nitro ($NO_2$), cyano (CN), thiocyano (SCN), thiol (SH) and carboxyl (COOH)) groups.

In the above formula, $R_1$ is preferably selected from the group consisting of:

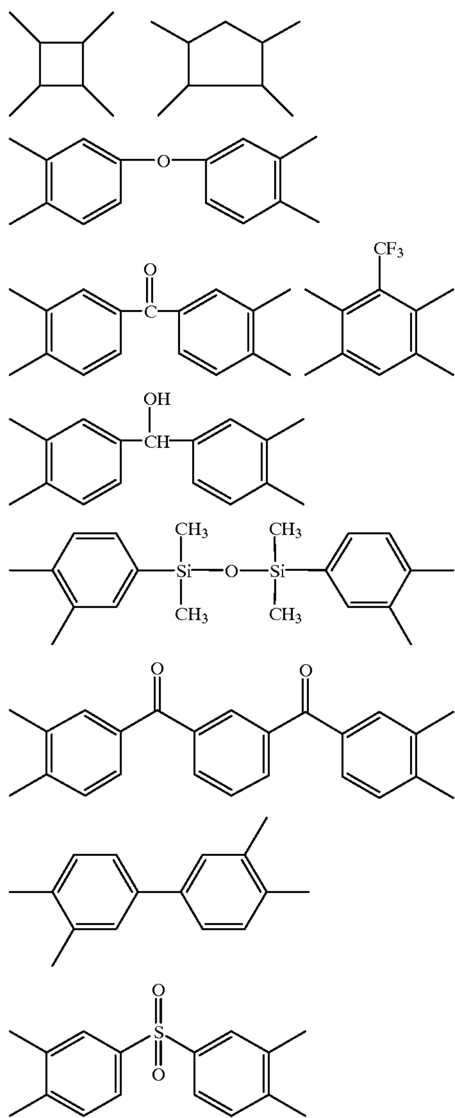

-continued

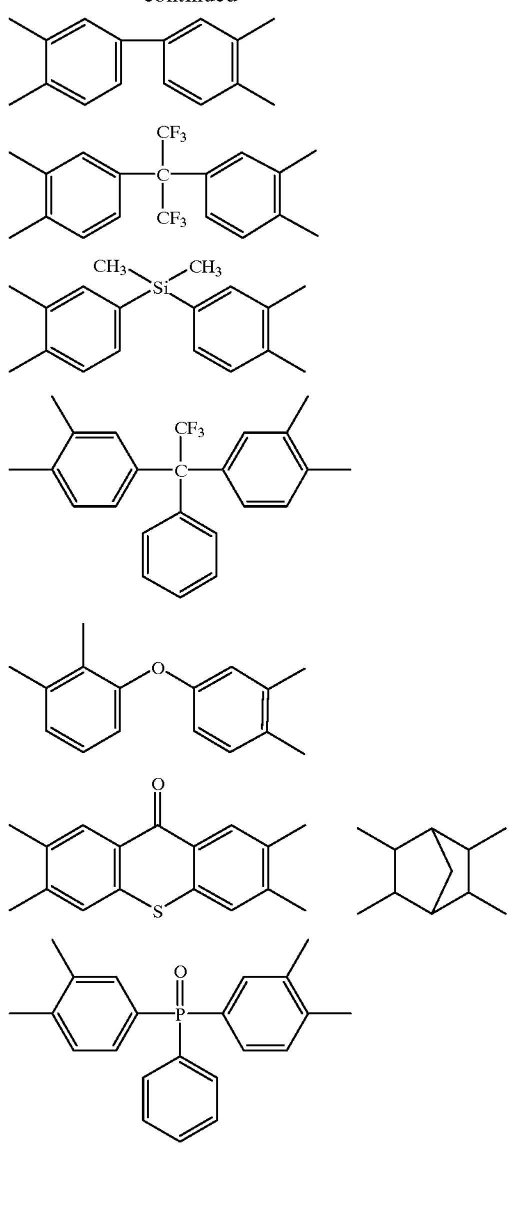

and $R_2$ is preferably selected from the group consisting of:

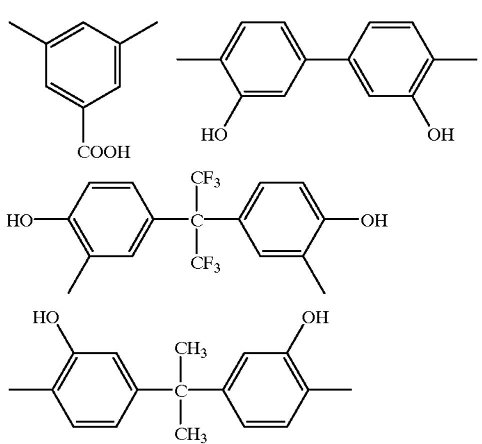

-continued

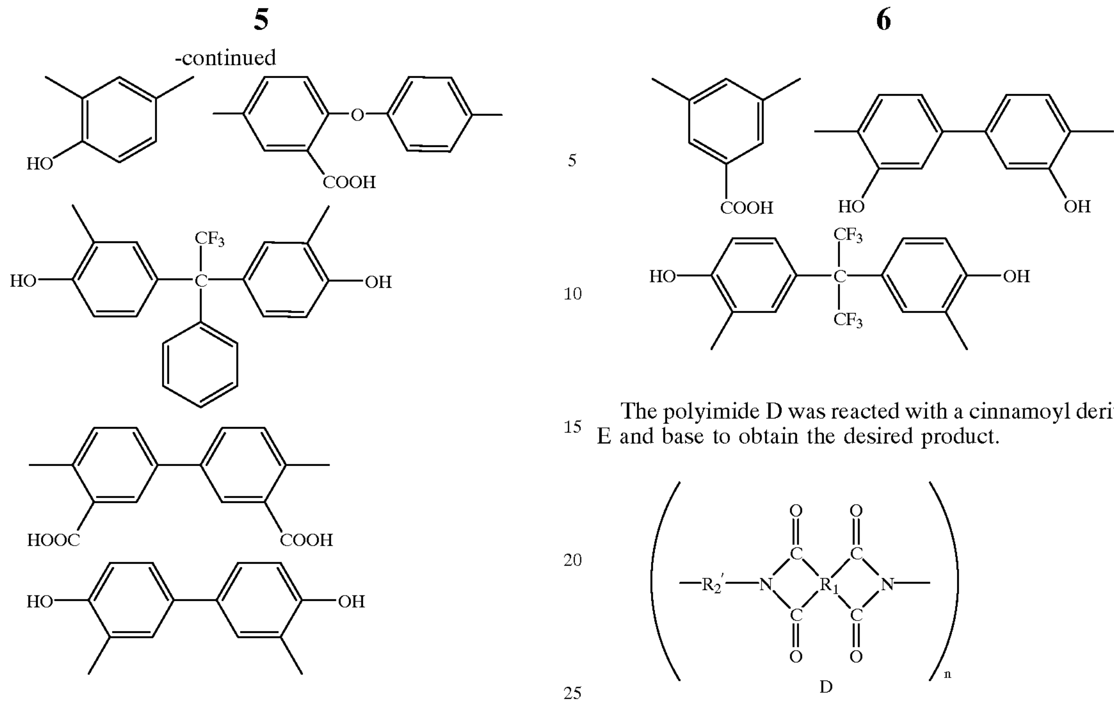

The weight-average molecular weight of the polyimide is between $5\times10^3$ and $2\times10^5$.

Now, methods of manufacturing an optical alignment composition, an alignment layer using the same and an LCD having the alignment layer according to the present invention will be described.

First, the method of producing soluble polyimide having a cinnamate group at its side chain will be explained.

Acid anhydride A and a diamine compound B were reacted to synthesize polyamic acid C. Then, the polyamic acid C was imidized to synthesize polyimide D.

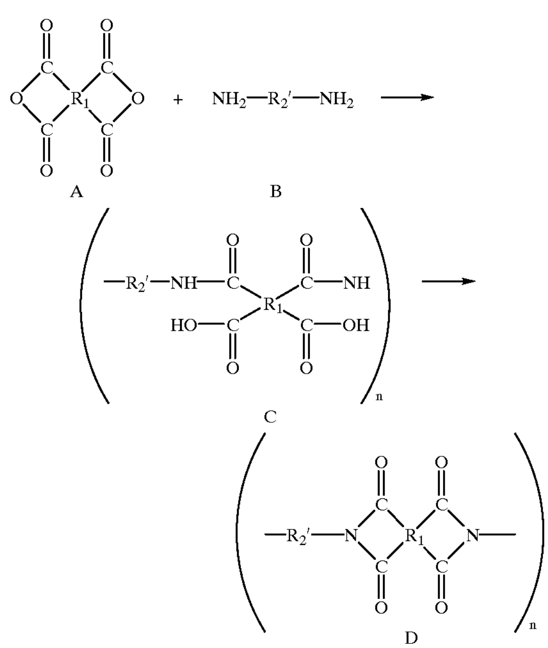

In the above reaction formula, $R_1$ is as defined above, $R_2$ is selected from the group consisting of:

The polyimide D was reacted with a cinnamoyl derivative E and base to obtain the desired product.

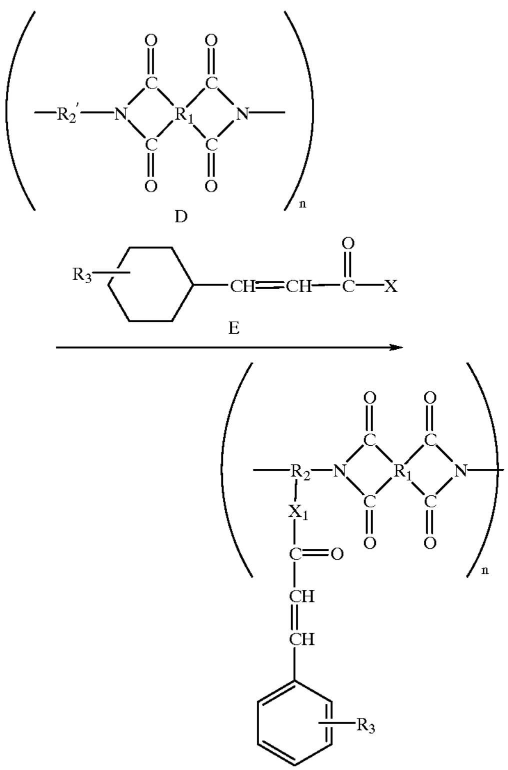

In the above reaction formula, $R_1$, $R_2$, $R_3$ and $X_1$ are as defined as above, and X is selected from the group consisting of chloride (Cl), bromide (Br), iodide (I) and hydroxy (OH) groups.

The synthesized polyimide was mixed with an appropriate solvent to produce an optical alignment composition. At this time, the solvent is not specifically restricted but is preferably N-methyl-2-pyrrolidone (NMP), dimethylformamide (DMA) or butylcellosolve.

The compositions were each coated on two glass substrates, and then the solvent was dried to form an alignment layer. Subsequently, linear polarized light (wavelength: 300~400 nm) was irradiated to conduct a photo-reaction. Then, two substrates were sealed using a spacer with a predetermined gap maintained, thereby completing a empty cell.

Thereafter, liquid crystals were injected into the empty cell to complete an LCD.

Hereinbelow, the present invention will be described with reference to various embodiments, but the invention is not limited thereto.

EXAMPLE 1
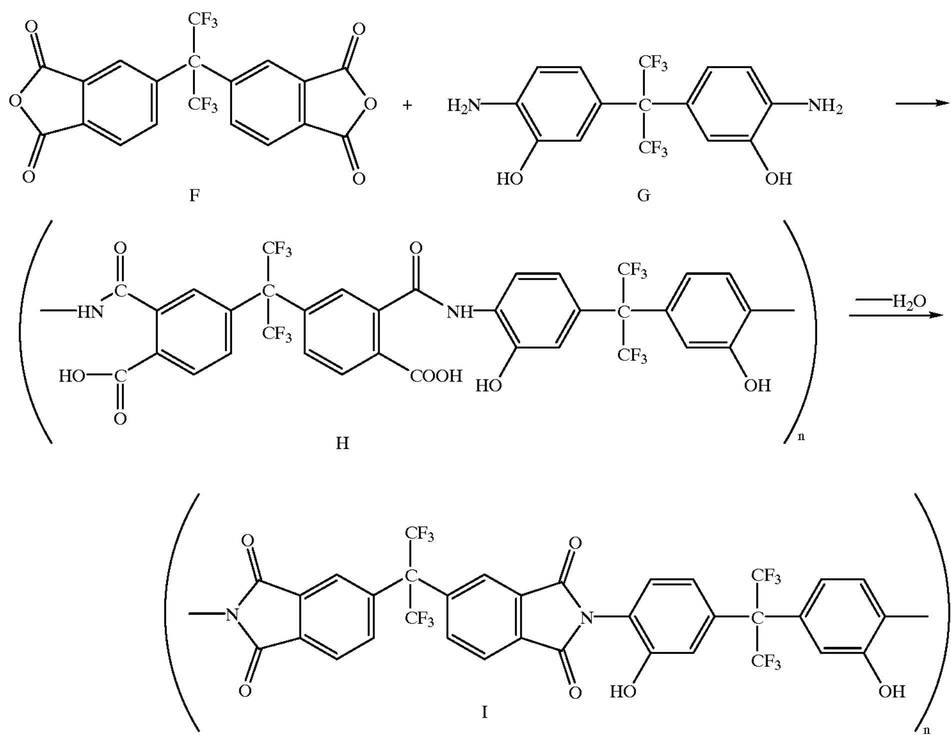
2.22 g (0.05 mol) of 4,4' -(hexafluoroisopropylidene) diphthalic anhydride) F, 1.83 g (0.005 mol) of diamine compound G and 20 g of NMP were mixed and reacted at 0~25° C. for 24 hours to synthesize a polyamic acid H.
Then, the polyamic acid H was dehydrated using an azeotrope method to synthesize polyimide I.
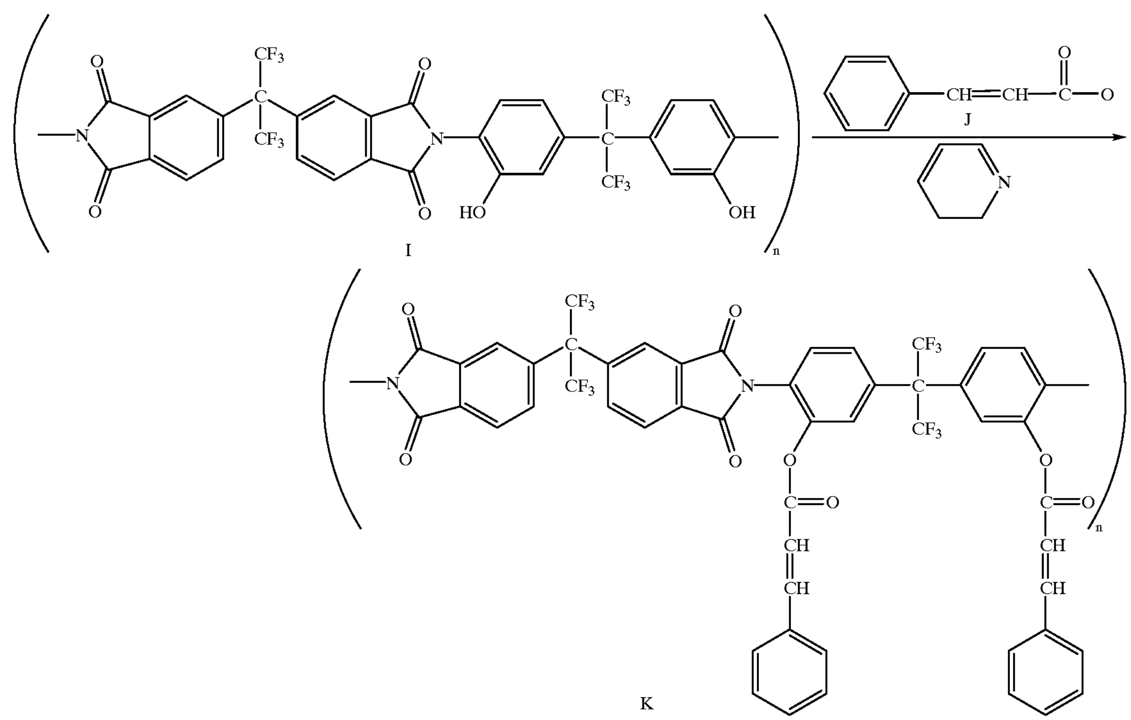

Subsequently, 3.343 g (0.00443 mol) of the polyimide I was mixed with 1.62 g (0.00975 mol) of the cinnamoyl chloride J and 30 g of THF, and 0.77 g (0.00975 mol) of pyridine was added thereto and then reacted at 60° C. for 120 minutes to synthesize polyimide K having a cinnamate group at its side chain.

0.2 g of the obtained polyimide (11) was dissolved in 10 g of NMP and then the compositions were each spin-coated on two glass substrates and dried at about 100° C. for 1 hour to form an alignment layer.

Then, linear polarized light (wavelength: about 313 nm) was irradiated into the alignment layer using a high pressure mercury lamp having light intensity of about 10 mw/cm$^2$ to conduct a photo-reaction for about 5 minutes.

An empty cell was manufactured by sealing two glass substrates where the alignment layer was formed using a spacer. The LCD was completed by injecting liquid crystals into the empty cell.

EXAMPLE 2

With the exception of polyimide obtained by reacting the polyimide (9) of Example 1, N,N' -dicyclohexylimide (DCC) and a compound of the formula (2) being used, instead of the polyimide (11), this embodiment was carried out in the same manner as described in Example 1.

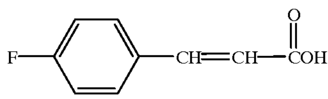

Comparative Example 0.2 g of polyvinylcinnamate (Aldrichi Chemical Company, Inc.) was dissolved in 10 g of NMP and then the composition was spin-coated on two glass substrates, and then dried at about 100° C. for 1 hour to form an alignment layer.

Subsequently, linear polarized light (wavelength: about 313 nm) was irradiated into the alignment layer to conduct a photo-reaction for about 5 minutes.

Then, two substrates where the alignment layers are each formed were sealed while maintaining a predetermined gap using a spacer, thereby completing an empty cell. Thereafter, liquid crystals were injected into the empty cell to complete the LCD.

In the LCD manufactured in Examples 1 and 2 and Comparative Example, the degree of alignment and thermal stability of the alignment layer were measured. Here, the degree of alignment was observed through a polarizing film, and the thermal stability was measured by raising the temperature up to 200° C., maintaining the resultant for a predetermined time at that temperature, lowering the temperature to room temperature, and then checking the deformation degree of the alignment layer through a polarizing film.

As the result of the measurement, in the LCD manufactured according to the example 1, the alignment property was excellent, and the thermal stability was very excellent, which is appreciated from the fact that the alignment state of the alignment layer was not changed even when the temperature was increased to 200° C. In the LCD manufactured according to Example 2, the thermal stability of the alignment layer was excellent, and further the pretilt angle of the liquid crystal was improved to a level of about 10°.

On the other hand, in the case of the LCD manufactured according to the comparative example, the alignment property was excellent but the thermal stability was bad, that is, the alignment state of the alignment layer was deformed from about 80° C.

According to the present invention, since the alignment layer with excellent thermal stability is obtained, the LCD having excellent performance can be manufactured.

What is claimed is:

1. An optical alignment composition comprising polyimide having a cinnamate group at its side chain, wherein the polyimide is represented by the formula 1:

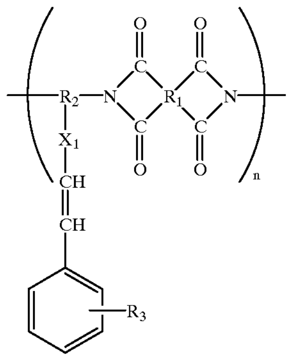

where $R_1$ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B; wherein A and B are each independently selected from the group consisting of an unsubstituted aromatic ring or an aromatic ring, wherein the aromatic ring is a monocyclic ring of six carbon atoms, a bicyclic ring of ten carbon atoms or a tricyclic ring of fourteen carbon atoms, and Y is —O—, carbonyl (C═O) or —C($R_4$) ($R_5$), wherein $R_4$ and $R_5$ are each independently selected from the group consisting of hydrogen, $C_1$–$C_{10}$ alkyl, and $C_1$–$C_{10}$ alkyl having at least one substituent (G); $R_2$ is selected from the group consisting of an unsubstituted aromatic ring or aromatic ring having at least one substituent (G), wherein the aromatic ring is a monocyclic ring of six carbon atoms, a bicyclic ring of ten carbon atoms or a tricyclic ring of fourteen carbon atoms, a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the said formula A—Y—B; $X_1$ represents —COOCO— or —OCO—; and $R_3$ is hydrogen, halide, a $C_1$–$C_{10}$ alkyl, a $C_1$–$C_{10}$ alkyl having at least one substituent (G), a $C_1$–$C_{10}$ alkoxy or a $C_1$–$C_{10}$ alkoxy having at least one substituent (G), wherein the substituent (G) is selected from the group consisting of a $C_1$–$C_{30}$ alkyl, phenyl, unsubstituted or substituted amino, a halide, a hydroxy (OH), a nitro ($NO_2$), cyano (CN), thiocyano (SCN), thiol (SH) and carboxyl (COOH)) groups.

2. The optical alignment composition of claim 1, wherein in the formula (1), $R_1$ is selected from the group consisting of:

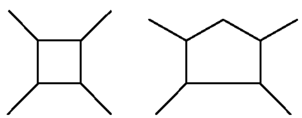

-continued
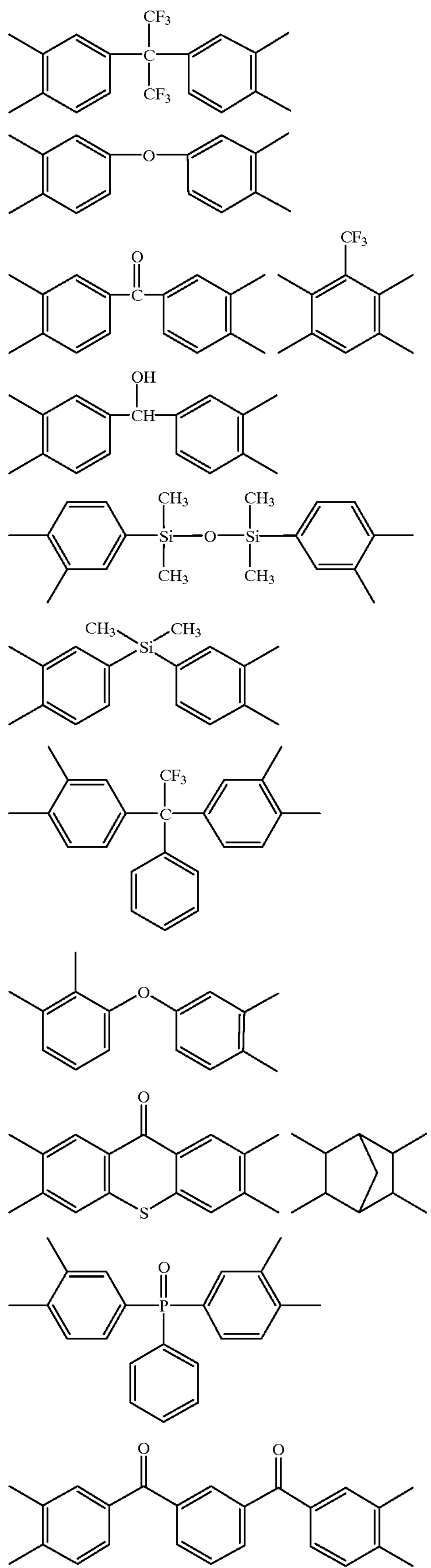
-continued
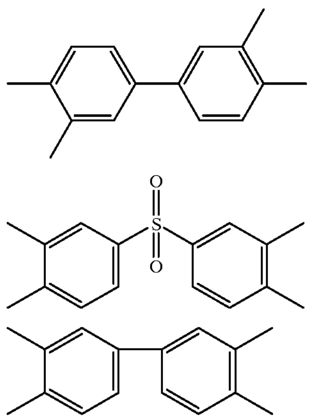
and $R_2$ is selected from the group consisting of:
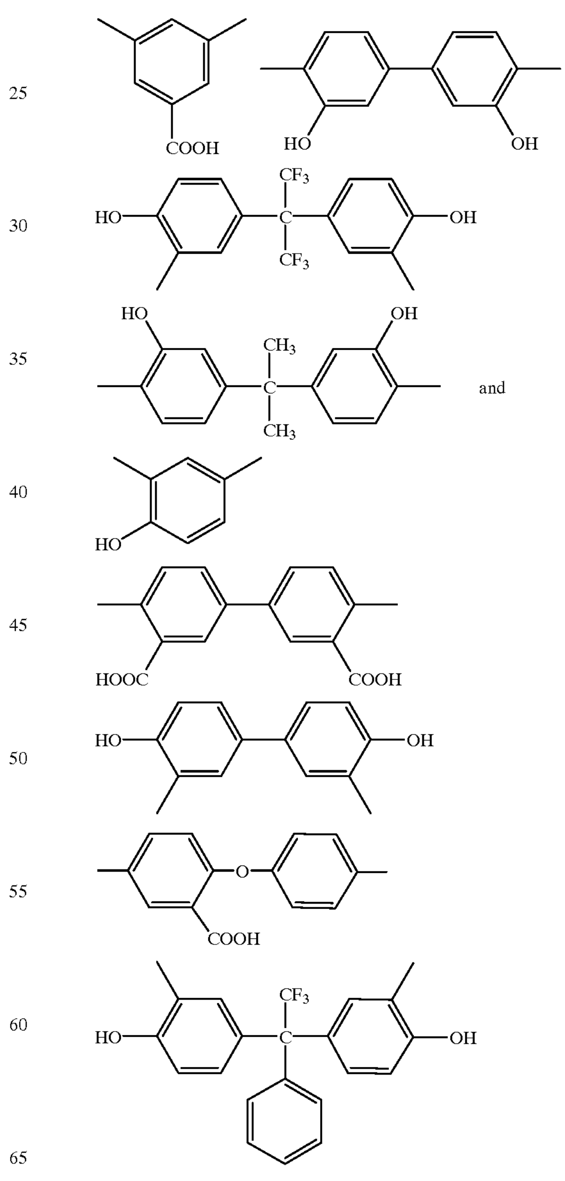

3. The optical alignment composition of claim 1, wherein the weight-average molecular weight of the polyimide is between $5\times10^3$ and $2\times10^5$.

4. An alignment layer comprising polyimide having a cinnamate group at its side chain, wherein the polyimide is represented by the formula 1:

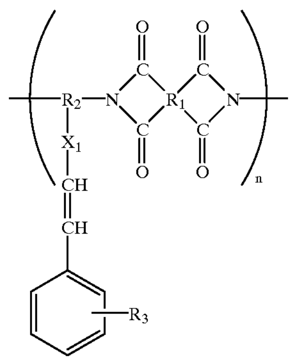

where $R_1$ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B; wherein A and B are each independently selected from the group consisting of a unsubstituted aromatic ring or an aromatic ring, wherein the aromatic ring is a monocyclic ring of six carbon atoms, a bicyclic ring of ten carbon atoms or a tricyclic ring of fourteen carbon atoms, and Y is —O—, carbonyl (C═O) or —C($R_4$) ($R_5$), wherein $R_4$ and $R_5$ are each independently selected from the group consisting of hydrogen, $C_1$–$C_{10}$ alkyl, and $C_1$–$C_{10}$ alkyl having at least one substituent (G); $R_2$ is selected from the group consisting of an unsubstituted aromatic ring or aromatic ring having at least one substituent (G), wherein the aromatic ring is a monocyclic ring or six carbon atoms, a bicyclic ring of ten carbon atoms or a tricyclic ring of fourteen carbon atoms, a $C_3$–$C_{10}$ cycloalkyl having at least one substituent (G), a $C_1$–$C_{10}$ cycloalkenyl, a $C_1$–$C_{10}$ cycloalkenyl having at least one substituent (G), and a compound having the said formula A—Y—B; $X_1$ represents —COOCO— or —OCO—; and $R_3$ is hydrogen, halide, a $C_1$–$C_{10}$ alkyl, a $C_1$–$C_{10}$ alkyl having at least one substituent (G), a $C_1$–$C_{10}$ alkoxy or a $C_1$–$C_{10}$ alkoxy having at least one substituent (G), wherein the substituent (G) is selected from the group consisting of a $C_1$–$C_{10}$ alkyl, phenyl, unsubstituted or substituted amino, a halide, a hydroxy (OH), a nitro ($NO_2$), cyano (CN), thiocyano (SCN), thiol (SH) and carboxyl (COOH)) groups.

5. The alignment layer of claim 4, wherein in the formula 1, $R_1$ is selected from the group consisting of:

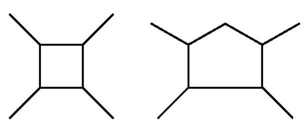

-continued

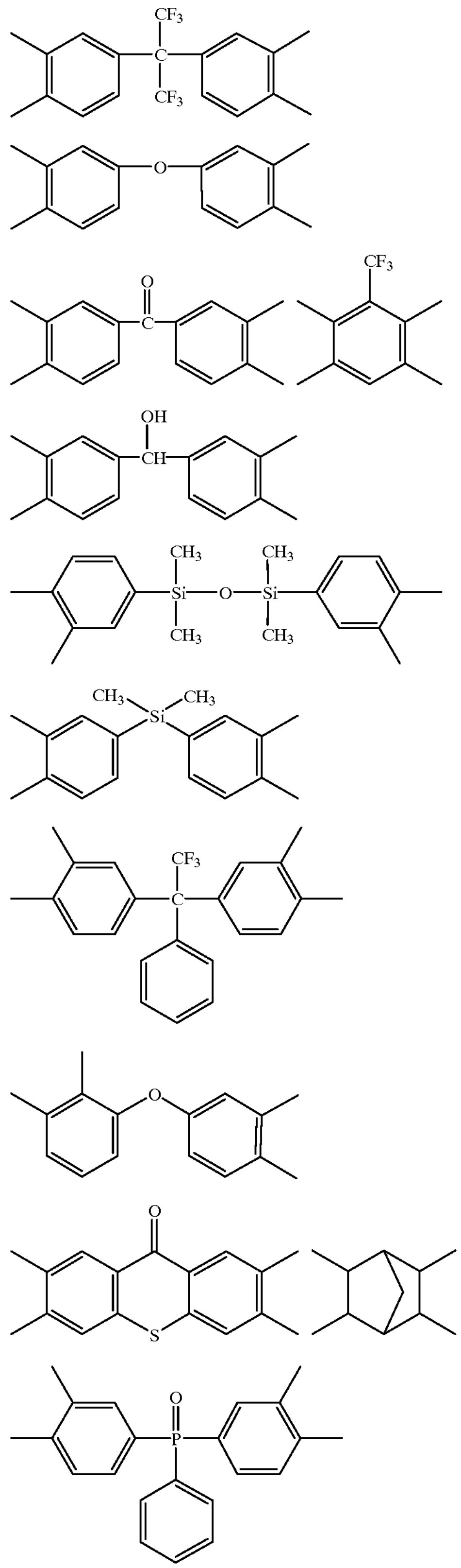

-continued

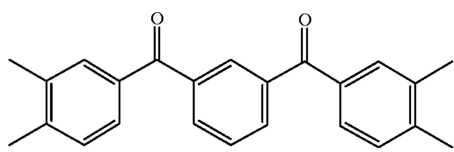

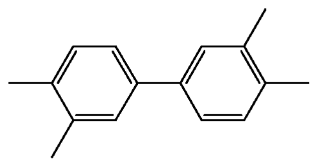

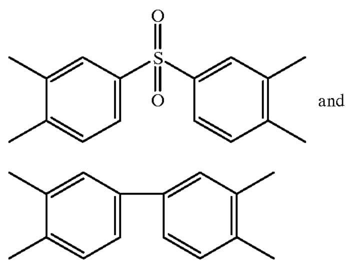

and $R_2$ is selected from the group consisting of:

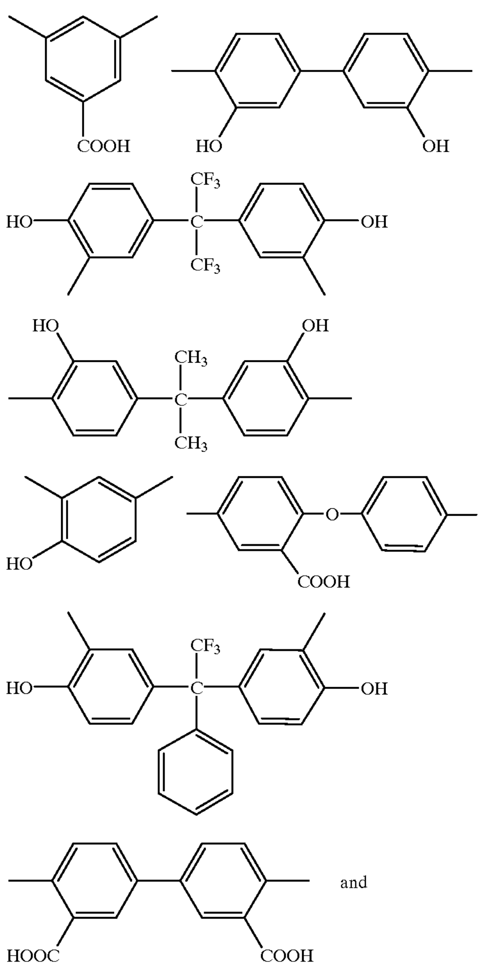

-continued

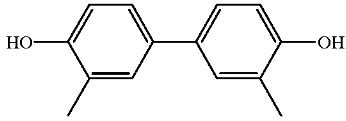

6. The alignment layer of claim 4, wherein the weight-average molecular weight of the polyimide is between $5\times10^3$ and $2\times10^5$.

7. A liquid crystal display device (LCD) comprising an alignment layer including polyimide having a cinnamate group at its side chain, wherein the polyimide is represented by the formula 1:

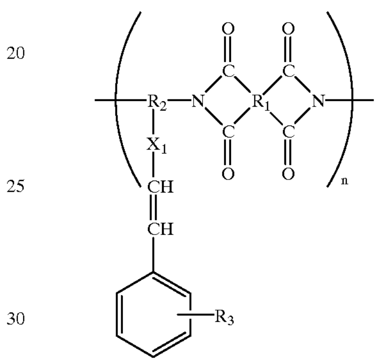

where $R_1$ is selected from the group consisting of $C_3$–$C_{10}$ cycloalkyl, a cycloalkyl having at least one substituent (G), $C_3$–$C_{10}$ cycloalkenyl, a cycloalkenyl having at least one substituent, and a compound of formula A—Y—B; wherein A and B are each independently selected from the group consisting of an unsubstituted aromatic ring or an aromatic ring, wherein the aromatic ring is a monocyclic ring of six carbon atoms, a bicyclic ring of ten carbon atoms or a tricyclic ring of fourteen carbon atoms, and Y is —O—, carbonyl (C═O) or —C($R_4$) ($R_5$), wherein $R_4$ and $R_5$ are each independently selected from the group consisting of hydrogen, $C_1$–$C_{10}$ alkyl, and $C_1$–$C_{10}$ alkyl having at least one substituent (G); $R_2$ is selected from the group consisting of an unsubstituted aromatic ring or aromatic ring having at least one substituent (G), wherein the aromatic ring is a monocyclic ring of six carbon atoms, a bicyclic ring of ten carbon atoms or a tricyclic ring of fourteen carbon atoms, a $C_3$–$C_{10}$ cycloalkyl, a $C_3$–$C_{10}$ cycloalkyl having at least one substituent (G), a $C_3$–$C_{10}$ cycloalkenyl, a $C_3$–$C_{10}$ cycloalkenyl having at least one substituent (G), and a compound having the said formula A—Y—B; $X_1$ represents —COOCO— or —OCO—; and $R_3$ is hydrogen, halide, a $C_1$–$C_{10}$ alkyl, a $C_1$–$C_{10}$ alkyl having at least one substituent (G), a $C_1$–$C_{10}$ alkoxy or a $C_1$–$C_{10}$ alkoxy having at least one substituent (G), wherein the substituent (G) is selected from the group consisting of a $C_1$–$C_{30}$ alkyl, phenyl, unsubstituted or substituted amino, a halide, a hydroxy (OH), a nitro ($NO_2$), cyano (CN), thiocyano (SCN), thiol (SH) and carboxyl (COOH)) groups.

8. The LCD of claim 7, wherein in the formula 1, $R_1$ is selected from the group consisting of:

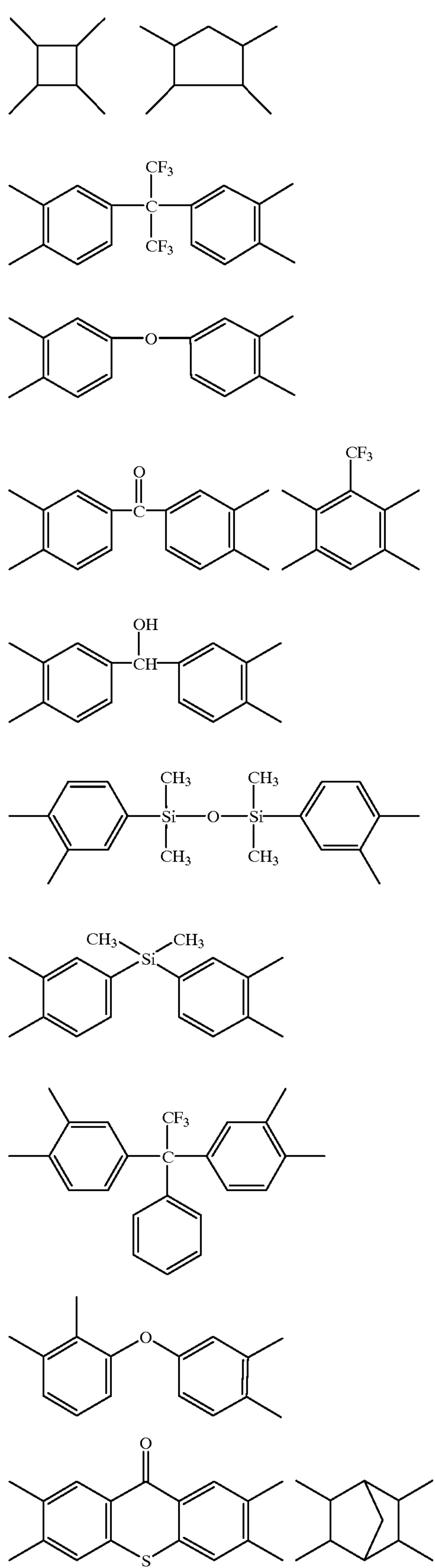
-continued
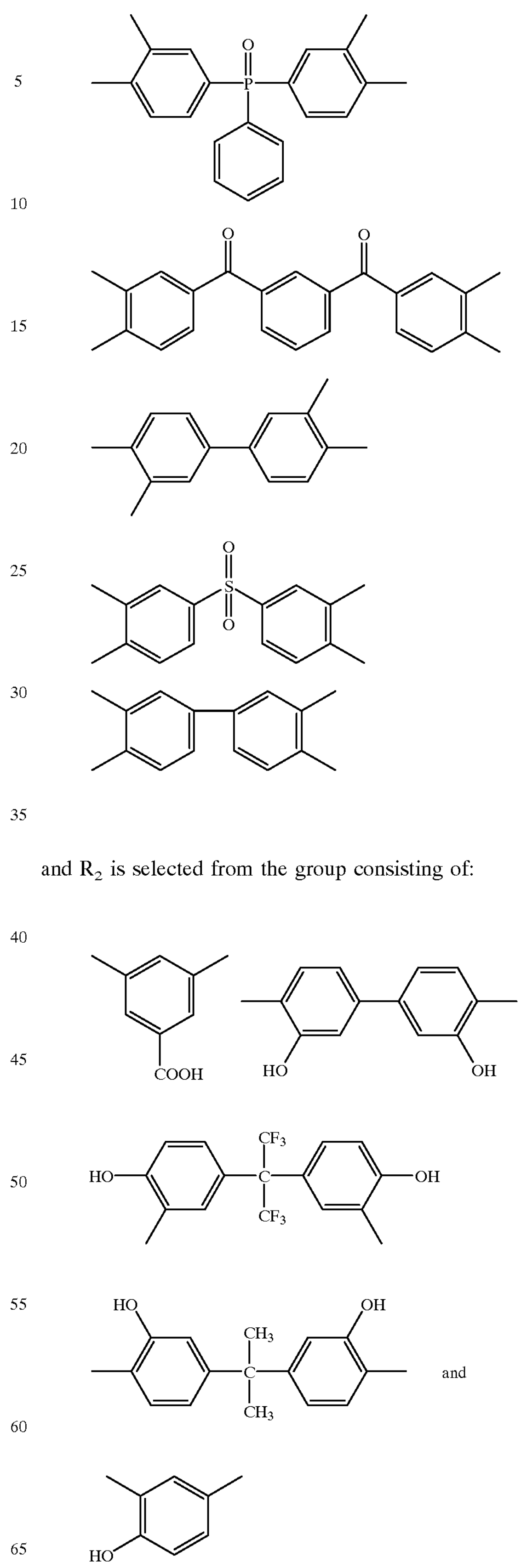
and $R_2$ is selected from the group consisting of:

-continued
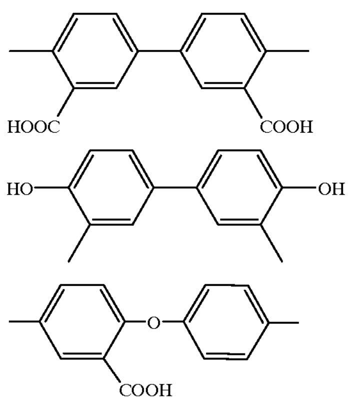
-continued
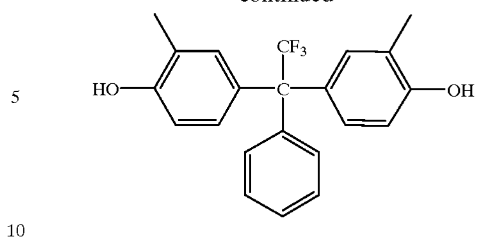
9. The LCD claim 7, wherein the weight-average molecular weight of the polyimide is between $5\times10^3$ and $2\times10^5$.
* * * * *